(12) United States Patent
Maes et al.

(10) Patent No.: US 6,676,848 B2
(45) Date of Patent: Jan. 13, 2004

(54) CORROSION INHIBITORS AND SYNERGISTIC INHIBITOR COMBINATIONS FOR THE PROTECTION OF LIGHT METALS IN HEAT-TRANSFER FLUIDS AND ENGINE COOLANTS

(75) Inventors: Jean-Pierre Leopold Maes, Merelbeke (BE); Serge Stefan Lievens, Merelbeke (BE)

(73) Assignees: Texaco Inc., White Plains, NY (US); Texaco Development Corporation, White Plains, NY (US)

( * ) Notice: Subject to any disclaimer, the term of this patent is extended or adjusted under 35 U.S.C. 154(b) by 213 days.

(21) Appl. No.: 09/987,577

(22) Filed: Nov. 15, 2001

(65) Prior Publication Data

US 2002/0053655 A1 May 9, 2002

Related U.S. Application Data

(62) Division of application No. 09/417,406, filed on Oct. 13, 1999, now Pat. No. 6,398,984.

(30) Foreign Application Priority Data

Oct. 14, 1998 (EP) .............................................. 98308380

(51) Int. Cl.[7] ................................................ C09K 5/00
(52) U.S. Cl. ............................ 252/76; 252/73; 252/71; 252/78.1; 252/79; 252/387; 252/388; 252/389.1
(58) Field of Search ............................ 252/71, 73, 76, 252/78.1, 79, 387, 388, 389.1

(56) References Cited

U.S. PATENT DOCUMENTS

| | | | |
|---|---|---|---|
| 4,105,405 A | 8/1978 | Wehle et al. | |
| 4,587,028 A | 5/1986 | Darden | |
| 4,647,392 A | 3/1987 | Darden et al. | |
| 4,657,689 A | 4/1987 | Darden | |
| 4,851,145 A | 7/1989 | Van Neste et al. | |
| 5,085,791 A | 2/1992 | Burns | |

FOREIGN PATENT DOCUMENTS

| | | |
|---|---|---|
| EP | 0229254 | 7/1987 |
| JP | A-08020763 | 1/1996 |
| JP | A-08085782 | 4/1996 |

OTHER PUBLICATIONS

*Kirk–Othmer Encyclopedia of Chemical Technology*, vol. 3, pp. 79–95 (John Wiley & Sons). 1978.

*Primary Examiner*—Yogendra N. Gupta
*Assistant Examiner*—Derrick G Hamlin
(74) *Attorney, Agent, or Firm*—Steven R. Ellinwood

(57) ABSTRACT

Corrosion protection of magnesium and aluminum alloys in engine coolants and heat-exchange fluids is achieved by the use of a select group of aliphatic and aromatic carboxylate acids or the alkaline metal, ammonium or amine salts thereof in combination with a fluoride and/or a fluorocarboxylic acid or salt thereof. These compositions have been found to significantly improve the high temperature magnesium corrosion protection properties of coolants, and are of use in automobile engine coolant systems.

1 Claim, 1 Drawing Sheet

Pictures of test specimens after ASTM D4340 test

Comparative Example C.  Comparative Example H.  Comparative Example I.  Comparative Example J.  Invention Example 1

Invention Example 2  Invention Example 3  Invention Example 4  Invention Example 5  Invention Example 6

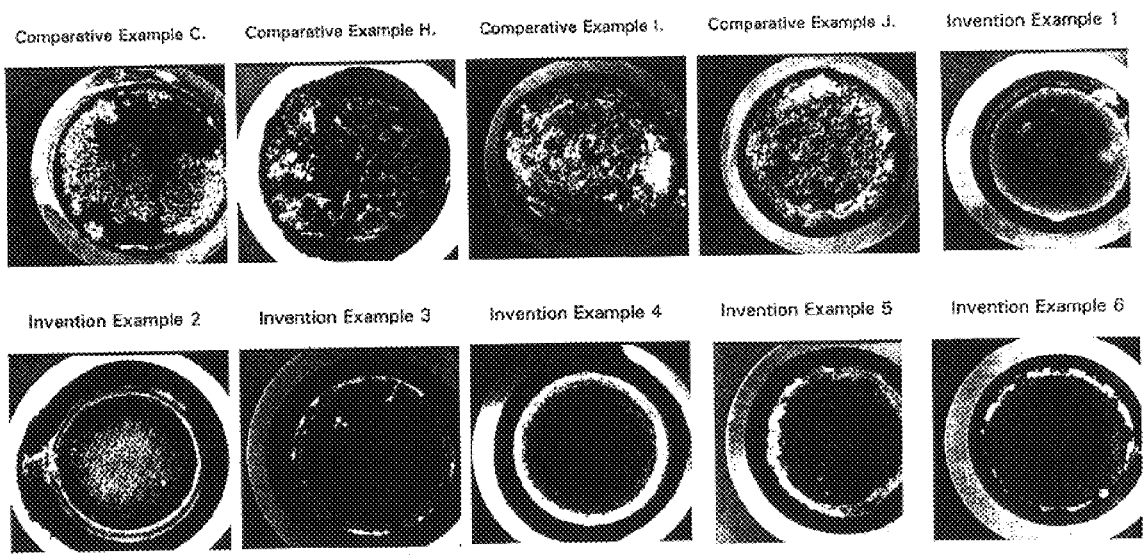
Figure 1 : Pictures of test specimens after ASTM D4340 test

CORROSION INHIBITORS AND SYNERGISTIC INHIBITOR COMBINATIONS FOR THE PROTECTION OF LIGHT METALS IN HEAT-TRANSFER FLUIDS AND ENGINE COOLANTS

This is a divisional of application Ser. No. 09/417,406, filed Oct. 13, 1999, now U.S. Pat. No. 6,398,984.

BACKGROUND OF THE INVENTION

1. Field of the Invention

The present invention relates to compositions which assist in the corrosion protection of magnesium, magnesium-aluminum, aluminum-magnesium and aluminum alloys in engine coolants and heat-exchange fluids. Aliphatic mono- or di-basic acids or aromatic carboxylate acids, or the alkali metal, ammonium or amine salts thereof, have been found to provide corrosion protection to magnesium, in addition to the protection that these acids already provide to other metals, such as aluminum, iron, copper and solder, when combined with a fluoride or a fluorocarboxylic acid or a salt thereof. Specific combinations of such acids or salts with fluoro compounds have been found to provide synergistic corrosion protection for magnesium. The optional addition of a hydrocarbyl triazole and/or a thiazole to these combinations provides improved corrosion protection, particularly to copper alloys but also to other metals such as aluminum. The presence of the fluoride and/or a fluorocarboxylate has been found to significantly improve the high temperature magnesium corrosion protection properties for individual carboxylates, for combinations of carboxylates, and for combinations of carboxylates and hydrocarbyl triazoles and/or thiazoles.

Automobile engine cooling systems contain a variety of metals, including copper, solder, brass, steel, cast iron, aluminum, magnesium, and their alloys. The possibility of corrosive attack on such metals is high, due to the presence of various ions as well as the high temperatures, pressures, and flow rates found in such cooling systems. The presence of corrosion products within the cooling system can interfere with heat transfer from the engine combustion chambers, which may subsequently cause engine overheating and engine component failure due to excess metal temperatures. See generally Fay, "Antifreezes and Deicing Fluids," *Kirk-Othmer Encyclopaedia of Chemical Technology* (1978) ed, vol 3, pp 79–95. It would therefore be generally advantageous if the formation of corrosion products within automobile cooling systems could be controlled or eliminated. It is one object of the instant invention to provide a corrosion inhibitor useful in the prevention and control of corrosion in automobile engine cooling systems containing various metals, particularly magnesium.

The trend towards improved fuel economy for automobiles has led to the increased use of lightweight materials such as aluminum and magnesium alloys for engine and cooling system components. However, it has been found that pitting and crevice corrosion are particularly prevalent in aluminum and magnesium-containing cooling systems. Pitting of thin-walled automobile radiator tubes may lead to tube perforation. Crevice corrosion at cylinder head packings or coolant hose connections may also occur. Both types of corrosion may lead to eventual coolant loss, with subsequent engine overheating and component failure. Other forms of localized corrosion such as deposit attack from deposition of corrosion products may also result.

Many conventional corrosion inhibitor additives used in automobile cooling systems do not provide adequate protection against the pitting, crevice, and deposit attack corrosion phenomena found with magnesium, aluminum and various other metal alloys. It would therefore be particularly advantageous if such localized corrosion phenomena could be controlled or eliminated. It is another object of the instant invention to provide a corrosion inhibitor for use in automobile cooling systems, which prevents or controls localized corrosion of magnesium.

All corrosion inhibitors employed in automobile antifreeze/coolant formulations are gradually depleted by use and the build-up of corrosion products in the cooling system. It would thus be advantageous if the build-up of corrosion products within the system and subsequent corrosion inhibitor depletion or degradation could be controlled or eliminated. It is a further object of the instant invention to provide a corrosion inhibitor which is less prone to depletion or degradation than traditional corrosion inhibitors used in antifreeze/coolant formulations.

DESCRIPTION OF RELATED INFORMATION

Organic Acid Technology (OAT) coolants and heat exchange fluids have been introduced, providing improved corrosion protection and having a long life. OAT corrosion-inhibitor packages in aqueous and glycol concentrates are used in automotive, heavy duty, marine and industrial applications. OAT corrosion-inhibitors are also used in secondary cooling systems and in a variety of industrial heat exchange fluids. Several U.S. and foreign patent references disclose the use of carboxylic acids, or the salts of such acids as corrosion inhibitors in antifreeze/coolant and heat-exchange fluid compositions. These compositions are optimized for the protection of aluminum and other materials currently used in the above applications.

Various corrosion inhibitors have been added to heat transfer fluids to reduce corrosion of metallic systems. For example, U.S. Pat. No. 4,587,028 (Darden) discloses non-silicate antifreeze formulations containing alkali metal salts of benzoic acid, dicarboxylic acid and nitrate. Additional ingredients including alkali metal hydroxides, alkali metal nitrates and aromatic triazoles, such as tolyltriazole or benzotriazole are preferably provided. U.S. Pat. No. 4,647,392 (Darden et al) discloses corrosion inhibitors using aliphatic monobasic acids or salts, hydrocarbyl dibasic acids or salts and hydrocarbonyl triazole. U.S. Pat. No. 4,657,689 (Darden) discloses corrosion inhibitors containing aliphatic monobasic acids or salts, hydrocarbyl dibasic acids or salts, hydrocarbyl azoles and specific hydrocarbyl alkali metal sulfonates. U.S. Pat. No. 5,085,791 (Burns) discloses antifreeze compositions containing cyclohexane acid corrosion inhibitor alone or in combination with other corrosion inhibitors, particularly sebacic acid and tolyltriazole. The cyclohexane acid includes cyclohexyl carboxylic (formic) acid, cyclohexyl acetic acid and cyclohexyl propionic acid. The cyclohexane acid is targeted to inhibit lead solder and/or aluminum corrosion. U.S. Pat. No. 4,105,405 (Wehle et al) discloses the use of cyclohexane hexacarboxylic acid corrosion inhibitors.

JP-A-08 020763 (Seiken Kogaku Kogyo KK) describes a fluid for use as a coolant in internal combustion engines comprising glycol, water, a magnesium compound, an alkyl benzoic acid (e.g. p-tert-butylbenzoic acid) or a salt, a do-decane diacid or a salt and a triazole or thiazole.

JP-A-08 085782 (Nippon Chem Kogyo KK) describes a glycol based antifreeze composition containing a dodecanedioic acid or a salt, p-tert-butylbenzoic acid or a salt and a triazole, together with a silicate, molybdate, benzoate or thiazole. The composition is free from amines, phosphates, borates and nitrites.

Engine manufacturers are now evaluating the use of magnesium as a material for engine and heat-transfer systems. Traditional inhibitor packages do not give adequate corrosion protection to magnesium components. In general, currently used OAT coolants are only mildly aggressive, but the protection levels for magnesium are not sufficient, particularly at the high temperatures found in working engines. Previous research has indicated that a combination of an alkylbenzoic acid (4-tert-butylbenzoic acid), an aliphatic monoacid (octanoic acid) and a hydrocarbyl triazole (tolyltriazole), provides improved corrosion protection for magnesium, in comparison with traditional and OAT coolant formulations (Table 1 in U.S. Pat. No. 4,851,145 (van Neste)). EP-A-0229254 (Asahi Glass Co Ltd) describes an electrolytic capacitor comprising a capacitor element and an electrolyte impregnated into the element, wherein the electrolyte contains a fluorocarboxylic acid or salt dissolved in an organic solvent.

There is need for a coolant system which provides high levels of corrosion protection to magnesium components.

SUMMARY OF THE INVENTION

The present invention relates to an antifreeze concentrate composition comprising one or more inhibitors selected from alkylbenzoic acid, $C_5$–$C_{15}$ mono- or di-basic acid or salts thereof, together with a fluoride and/or a fluorocarboxylic acid or salt thereof.

Amongst the aromatic carboxylates, the group of alkylbenzoic acids of general formula:

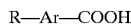

R—Ar—COOH where Ar is benzyl and R is a $C_1$–$C_8$ alkyl radical or an element of group 7, e.g. F, are preferred. 4-Tert-butylbenzoic acid (hereafter referred to as PTBBA), is the most preferred alkylbenzoic acid and 4-fluoro benzoic acid is the most preferred compound when R is an element of group 7. Alkali metal, ammonium or amine salts of the alkylbenzoic acid may be used. The most preferred alkali metal salts are potassium and sodium.

Aliphatic carboxylate acids that provide corrosion protection may be any $C_5$–$C_{15}$ aliphatic monobasic acid or dibasic acid or the alkali metal, ammonium or amine salt of said acids. Heptanoic acid, octanoic acid, and nonanoic acid (or isomers thereof), and mixtures thereof are the preferred monobasic acids. Decanoic acid and undecanoic acid provide good protection but solubility of the higher alkyl acids in water is limited. Of the dibasic acids, dodecanedioic acid provides reasonably good magnesium protection. Of the naphtylcarboxylic acids, 1-naphtylcarboxylic acid is the preferred carboxylic acid.

It has been found that the combination of one or more of the above described acids, together with the fluoro compound, gives a synergetic effect for improved magnesium protection. The combination of PTBBA and octanoic acid is especially preferred. Nonanoic and heptanoic acid are good alternatives for octanoic acid. Compositions formulated with no hydrocarbyl triazole give good magnesium protection, or hydrocarbyl triazole at a level below 0.2 wt %. The addition of a hydrocarbyl triazole to these combinations provides additional copper protection, as expected. Improved corrosion protection properties were found for the other metals, especially for aluminum.

It has been found that the addition of a fluoride or a fluoro carboxylate to an aliphatic carboxylic acid or to an alkylbenzoic acid or to the preferred synergistic combinations of alkylbenzoic acids and the preferred monocarboxylic acids, significantly improves the high temperature corrosion protection properties of the formulation. Most particularly, such systems give improved protection against magnesium corrosion.

DETAILED DESCRIPTION OF THE INVENTION

The present invention firstly identifies a group of specific aliphatic and aromatic carboxylates that provide improved corrosion protection, when used with a fluoride and/or a fluorocarboxylic acid or salt thereof.

Amongst the aromatic carboxylates are preferred the group of alkylbenzoic acids of general formula:

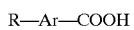

R—Ar—COOH where Ar is benzyl and R is a $C_1$–$C_8$ alkyl radical. In this invention, 4-tert-butylbenzoic acid (PTBBA) is preferred. Any alkali metal, ammonium or amine salts of the alkylbenzoic acid may be used to form the alkylbenzoic acid salt; however, alkali metals are preferred. The most preferred alkali metal salts are potassium and sodium. Of the naphtylcarboxylic acids, 1-naphtylcarboxylic acid is the preferred carboxylic acid.

Aliphatic carboxylate acids that provide corrosion protection may be any $C_5$–$C_{15}$ aliphatic monobasic acid or dibasic acid or the alkali metal, ammonium or amine salt of said acids. This would include one or more of the following acids or isomers thereof: heptanoic acid, octanoic acid, and nonanoic acid, and mixtures thereof are the preferred monobasic acids. Decanoic acid and undecanoic acid provide good protection but solubility of the higher alkyl acids in water is limited. Of the dibasic acids, dodecanedioic acid provides reasonably good magnesium protection.

Combinations of one or multiples of the above mentioned aromatic carboxylates with one or more aliphatic carboxylates, together with the fluoro compound, give a synergistic effect for the protection of magnesium alloys. When using a hydrocarbyl triazole component such as an aromatic triazole or an alkyl substituted aromatic triazole such as benzotriazole or tolyltriazole, increased protection of copper is achieved. Improved protection of other metals, particularly aluminum is also observed. For magnesium protection alone the use of a hydrocarbyl triazole is optional.

The additional inhibitor which now provides superior synergistic corrosion protection, especially for magnesium alloys, especially at elevated temperatures, in combination with one carboxylic acid or with a synergetic mixtures of multiple acids such as the combination of aliphatic carboxylates with the alkylbenzoic acids, such as mentioned above, is fluoride. Used alone, fluoride provides a very low level of protection. It is an important aspect of this invention that fluor compounds such as fluorides and/or fluoro carboxylates, in combination with aliphatic carboxylates or alkylbenzoic acids give a synergistic effect to significantly reduce corrosion, especially of magnesium at elevated temperatures. The fluoride can be introduced in the formulation as hydrogen fluoride and/or a fluoro carboxylic acid or the alkali metal, ammonium or amine soluble salt of the mentioned acid.

The combination of the corrosion inhibitors of the instant invention will most typically be employed in antifreeze formulations as a coolant for internal combustion engines. Other applications may include hydraulic fluids, aqueous cutting oils, paints, soluble oils, metal cutting fluids, aircraft deicers, and greases. In these applications the aliphatic acids and alkylbenzoates may be formed with metal hydroxides including sodium, potassium, lithium and barium.

In a preferred embodiment of the instant invention, the above described corrosion inhibitors may be employed in a mixture with a liquid alcohol freezing point depressant to form a novel antifreeze/coolant concentrate composition for use in the cooling systems of internal combustion engines. The coolant concentrate composition preferably comprises: from 80–99 weight percent of a water soluble liquid alcohol freezing point depressant; from 0.01–15, preferably 0.1–5 weight percent of the above described alkylbenzoic acid/salt and/or aliphatic carboxylic acid/salt component and from 0.005–5, preferably 0.01–1 weight percent of hydrogen fluoride and/or a fluoro carboxylate. In addition one of the above mentioned components, hydrocarbyl triazole components can optionally be used at from 0.005–1, preferably 0.1–0.3 weight percent.

The liquid alcohol freezing point depressant component of the above described coolant in the instant invention includes glycols such as ethylene glycol, di-ethylene glycol, propylene glycol, di-propylene glycol and glycol monoethers such as the methyl, ethyl, propyl and butyl ethers of ethylene glycol, di-ethylene glycol, propylene glycol and di-propylene glycol. Ethylene and propylene glycol are particularly preferred as the freezing point depressant component. In the above described coolant concentrate composition of the instant invention, an additional dicarboxylic acid preferably dodecanoic diacid, may be employed at concentrations of 0.01–15.0 weight percent, preferably 0.1–5.0 weight percent. Additional conventional corrosion inhibitors such as alkali metal borates, silicates, benzoates, nitrates, nitrites, molybdates or hydrocarbyl thiazoles may also be employed at concentrations of 0.01–5.0 weight percent.

In another embodiment of the invention, the above described corrosion inhibited coolant concentrate composition is diluted with 10–90 volume percent, preferably 25–75 volume percent of water. In yet another embodiment of the invention, the above described corrosion inhibitor combinations are used in aqueous solutions of alternative freezing point depressants such as organic acid salt solutions. Acetates, formates and proprionates are particularly preferred.

EXAMPLES

The method of the invention will be further illustrated by the following examples, which are not intended to limit the scope of the invention.

Comparative Examples

Example A. (Comparative Example)

An antifreeze formulation was prepared comprising a major amount of ethylene glycol, 3 weight percent 2-ethyl hexanoic acid (2-EHA).

Example B. (Comparative Example)

An antifreeze formulation was prepared comprising a major amount of ethylene glycol, 0.2 weight percent tolyltriazole (TTZ).

Example C. (Comparative Example)

An antifreeze formulation was prepared comprising a major amount of ethylene glycol, 0.2 weight percent Hydrogen fluoride (HF) (50 weight percent in water).

Example D. (Comparative Example)

An antifreeze formulation was prepared comprising a major amount of ethylene glycol, 3 weight percent heptanoic acid (HA).

Example E. (Comparative Example)

An antifreeze formulation was prepared comprising a major amount of ethylene glycol, 3 weight percent octanoic acid (OA).

Example F. (Comparative Example)

An antifreeze formulation was prepared comprising a major amount of ethylene glycol, 3 weight percent dodecanedioic acid (DDA).

Example G. (Comparative Example)

An antifreeze formulation was prepared comprising a major amount of ethylene glycol, 3 weight percent sebacic acid (SA).

Example H. (Comparative Example)

An antifreeze formulation was prepared comprising a major amount of ethylene glycol, 3 weight percent octanoic acid, 0.2 percent TTZ.

Example I. (Comparative Example)

An antifreeze formulation was prepared comprising a major amount of ethylene glycol, 3 weight percent PTBBA, 0.2 percent TTZ.

Example J. (Comparative Example)

An antifreeze formulation was prepared comprising a major amount of ethylene glycol, 1.5 weight percent PTBBA, 1.5 weight percent octanoic acid, 0.2 weight percent TTZ.

Example K. (Comparative Example)

An antifreeze formulation was prepared comprising a major amount of ethylene glycol, 1.5 weight percent PTBBA, 1.5 weight percent octanoic acid, 0.02 weight percent TTZ.

Example L. (Comparative Example)

An antifreeze formulation was prepared comprising a major amount of ethylene glycol, 1.5 weight percent PTBBA, 1.5 weight percent octanoic acid.

Example M. (Comparative Example)

An antifreeze formulation was prepared comprising a major amount of ethylene glycol, 1.5 weight percent PTBBA, 1.5 weight percent octanoic acid, 0.5 percent 2-ethylhexanoic acid, 0.2 weight percent TTZ.

Example N. (Comparative Example)

An antifreeze formulation was prepared comprising a major amount of ethylene glycol, 1.5 weight percent PTBBA, 1.5 weight percent octanoic acid, 0.1 weight percent sodium metasilicate pentahydrate, 0.2 weight percent TTZ.

Examples of the Invention

Example 1

An antifreeze formulation was prepared comprising a major amount of ethylene glycol, 1.5 weight percent PTBBA, 1.5 weight percent OA, 0.2 weight percent HF (50 weight percent in water), 0.2 weight percent TTZ.

Example 2

An antifreeze formulation was prepared comprising a major amount of ethylene glycol, 3 weight percent PTBBA, 0.2 weight percent HF.

Example 3

An antifreeze formulation was prepared comprising a major amount of ethylene glycol, 3 weight percent OA, 0.2 weight percent HF.

Example 4

An antifreeze formulation was prepared comprising a major amount of ethylene glycol, 3 weight percent heptanoic acid, 0.2 weight percent HF.

Example 5

An antifreeze formulation was prepared comprising a major amount of ethylene glycol, 1.5 weight percent PTBBA, 1.5 weight fluorobenzoic acid.

Example 6

An antifreeze formulation was prepared comprising a major amount of ethylene glycol, 1.5 weight percent PTBBA, 1.5 weight percent OA, 0.2 weight percent sodium fluoride, 0.2 weight percent TTZ.

The additive systems are summarized in Table 1.

Invention Example 1 describes the combination of the addition of a fluor compound to a combination of alkylbenzoic acid and monobasic/dibasic acid. Invention Example 2 describes the combination of the addition of a fluor compound to an alkylbenzoic acid. Invention Examples 3, 4 and 5 describe the combination of the addition of a fluor compound to an aliphatic carboxylic acid. The fluor compound can be a fluoride (3 and 4) or a fluoro-carboxylate (5). Invention Example 6 is similar to Invention Example 1, but sodium fluoride is used instead of hydrogen fluoride.

It is well known that corrosion resistance of a metal or metal alloy depends upon both the stability of its passivating oxide protective film and its ability to repassivate active corrosion regions on the surface of the metal or alloy. The speed of corrosion on the other hand is related to the current density. A rapid Cyclic Polarization Scanning (RCP) technique, based on cyclic potentiokinetic polarization and described in the CEBELCOR (Centre Beige d'Etude de la corrosion) publication *Rapports Techniques,* Vol. 147, R. T. 272 (August 1984), may be used to determine the susceptibility of a metal or alloy to localized corrosion. The RCP technique measures rupture or pitting potential ($E_r$), repassivation potential ($E_p$) and current density ($I_a$) for a given metal or alloy. $E_r$ is the potential at which the passivating film of a given material breaks down, and is directly related to the pitting tendency of the material in a particular environment. $E_p$ is the potential at which active corrosion regions of the material are repassivated in a given environment. $I_a$ is the current density which is a measure for the general corrosion rate. The higher $I_a$, the higher the corrosion rate. $E_r$, $E_p$ and $I_a$ are measured with a silver reference electrode and a working electrode constructed from the material subject to corrosive attack. The higher (more

TABLE 1

| | Monoacids | | | Diacids | | Alkyl benzoic acid | Hydro carbyl triazole | | Fluor compound | |
|---|---|---|---|---|---|---|---|---|---|---|
| | 2-EHA | HA | OA | SA | DDA | PTBBA | TTZ | Silicate | HF | Fluoro carboxylate |
| Comparative Examples | | | | | | | | | | |
| A. | 3% | | | | | | | | | |
| B. | | | | | | | 0.2% | | | |
| C. | | | | | | | | | 0.2% | |
| D. | | 3% | | | | | | | | |
| E. | | | 3% | | | | | | | |
| F. | | | | 3% | | | | | | |
| G. | | | | | 3% | | | | | |
| H. | | | 3% | | | | 0.2% | | | |
| I. | | | | | | 3% | 0.2% | | | |
| J. | | | 1.5% | | | 1.5% | 0.2% | | | |
| K. | | | 1.5% | | | 1.5% | 0.02% | | | |
| L. | | | 1.5% | | | 1.5% | | | | |
| M. | 0.5% | | 1.5% | | | 1.5% | 0.2% | | | |
| N. | | | 1.5% | | | 1.5% | 0.2% | 0.1% | | |
| Invention Examples | | | | | | | | | | |
| 1 | | | 1.5% | | | 1.5% | 0.2% | | 0.2% | |
| 2 | | | | | | 3% | | | 0.2% | |
| 3 | | | 3% | | | | | | 0.2% | |
| 4 | | 3% | | | | | | | 0.2% | |
| 5 | | | | | | 1.5% | | | | 1.5% |
| 6 | | | 1.5% | | | 1.5% | 0.2% | | 0.2% | | positive) the $E_r$ value, the more effective a given antifreeze formulation is in preventing pitting corrosion initiation and progress. Similarly, a higher (more positive) $E_p$ value indicates that the particular corrosion inhibitor formulation has a greater ability to repassivate existing pits and crevices. On the other hand the higher $I_a$ value the faster corrosion is proceeding, the less effective a particular corrosion inhibitor is for protecting a certain metal or alloy.

The RCP test procedure may be described as follows; polished specimens of the metal to be tested (working electrode) are immersed in a 30 percent by volume solution of a given antifreeze concentrate formulation in hard ASTM corrosive water; that is water containing 148 mg/l sodium sulfate, 165 mg/l sodium chloride, 138 mg/l sodium bicarbonate (ASTM 1384 corrosive water) and in addition 364 mg/l calcium chloride mono hydrate.

Polarization is achieved by polarizing at a scan rate of 2 mV/second until rupture potential $E_r$ is attained. A rapid increase in polarization current results at $E_r$ as the protective passivating film breaks down. When the current reaches a predetermined maximum value, the scanning direction is reversed towards more cathodic potentials. The repassivation potential $E_p$ is determined during this final phase of the RCP scan.

Table 2 shows the results of RCP measurements using the compositions of the invention on magnesium, aluminum and copper; measuring $E_r$, $E_p$ and $I_a$. Adequate reduced corrosion rates are found for the invention examples (1 to 6).

may be present in aluminum cylinder head engines. For the purposes of the present application, magnesium alloy was used instead of aluminum casting alloys. A heat flux is established through a cast magnesium alloy typical of that used in engine cylinder heads whilst exposed to an engine coolant under a pressure of 193 kPa. The temperature of the magnesium specimen is maintained at 135° C. and the test is continued for one week. The effectiveness of the coolant for preventing corrosion of the magnesium under heat-transfer conditions is evaluated on the basis of the weight change of the test specimen and also on the visual appearance. A heat-transfer corrosion cell is assembled according to the test methodology. The magnesium specimen is 6.5 cm in diameter, and 1.3 cm thick. The system is heated through a thermocouple inserted into a thermocouple hole in the test specimen. The test is carried out based upon 165 mg of radiant grade sodium chloride dissolved in 750 ml distilled or de-ionized water. 250 ml of the test coolant is then added. This amount is sufficient for two tests. The results of the ASTM D 4340 tests are shown in FIG. 1. FIG. 1 shows photographs of the corroded magnesium specimens after test for several Comparative Examples and much less corroded specimens for the Invention Examples (1 to 5).

It has been found that corrosion protection at high temperatures, as evaluated in the ASTM D4340 test on magnesium, is further significantly improved by the synergistic effect of a fluor compound, preferably a fluoride and/or a fluoro-carboxylate. Photographs of magnesium

TABLE 2

RCP measurements to determine corrosion inhibitor effectiveness ($E_r$, $E_p$ in mV, $I_a$ in $\mu A/cm^2$)

|  | Magnesium | | | Aluminum | | | Copper | | |
|---|---|---|---|---|---|---|---|---|---|
|  | $E_r$ | $E_p$ | $I_a$ | $E_r$ | $E_p$ | $I_a$ | $E_r$ | $E_p$ | $I_a$ |
| Comparative Examples | | | | | | | | | |
| A. | −1130 | * | 90 | −260 | * | 35 | 830 | −10 | 20 |
| B. | −1120 | * | 100 | −400 | −520 | 25 | 640 | 60 | 0.9 |
| C. | 750 | * | 1000 | −500 | −750 | 20 | 120 | 100 | 20 |
| D. | −240 | * | 100 | 1390 | 460 | 50 | 900 | −10 | 3 |
| E. | >2400 | * | 100 | >2400 | * | 20 | | | |
| F. | −440 | * | 100 | 960 | * | 30 | 920 | | 3 |
| G. | −1100 | * | 100 | 340 | * | 40 | 900 | | 6 |
| H. | >2400 | −220 | 40 | 1420 | 580 | 30 | | | |
| I. | >2400 | * | 35 | −340 | −520 | 20 | | | |
| J. | >2400 | −1120 | 20 | >2400 | * | 20 | 1750 | 1500 | 1 |
| K. | >2400 | * | 30 | >2400 | * | 15 | 1600 | 1200 | 2 |
| L. | 2200 | 700 | 30 | >2400 | * | 15 | 1300 | 1000 | 1 |
| M. | >2400 | 780 | 30 | >2400 | * | 20 | 1320 | 1040 | 2 |
| N. | 2300 | −70 | 30 | >2400 | >2400 | 20 | 1810 | 1320 | 2 |
| Invention Examples | | | | | | | | | |
| 1 | >2400 | −1000 | 20 | | | | | | |
| 2 | 700 | * | 30 | 300 | −700 | 10 | | | |
| 3 | >2400 | 700 | 20 | 1400 | * | 10 | | | |
| 4 | 200 | * | 100 | 1020 | * | 30 | | | |
| 5 | 300 | * | 30 | 200 | * | 20 | | | |

*Repassivation potential $E_p$ could not be determined.

The ASTM D4340 test is a standard test method which covers a laboratory screening procedure for evaluating the effectiveness of engine coolants in combatting corrosion of aluminum casting alloys under heat-transfer conditions that coupons are shown in FIG. 1. Comparative Example (C) shows very severe attack with deep pitting and deposits. Examples H, I and J show various gradations of minor attack and some deposits. The addition of a fluor compound in Examples 1 to 6, shows a dramatic improvement of corrosion protection and a significant reduction in deposit formation.

What is claimed is:

1. A heat transfer fluid formulation comprising:
   (a) from 65–99 weight percent of a water soluble liquid alcohol freezing point depressant;
   (b) from 0.1–15 weight percent of alkylbenzoic acid of general formula R—Ar—COOH where Ar is benzyl and R is a $C_1$–$C_8$ alkyl radical or an element of Group 7, or a salt thereof;
   (c) from 0.1–15 weight percent of $C_5$–$C_{15}$ aliphatic monobasic or dibasic acid or salt thereof;
   (d) from 0.01–5 weight percent of hydrogen fluoride and/or a fluorocarboxylic acid or salt thereof.

* * * * *